Nov. 15, 1955  B. A. HOHMANN  2,723,812
GLIDER PICK-UP
Filed Jan. 8, 1952  3 Sheets-Sheet 1
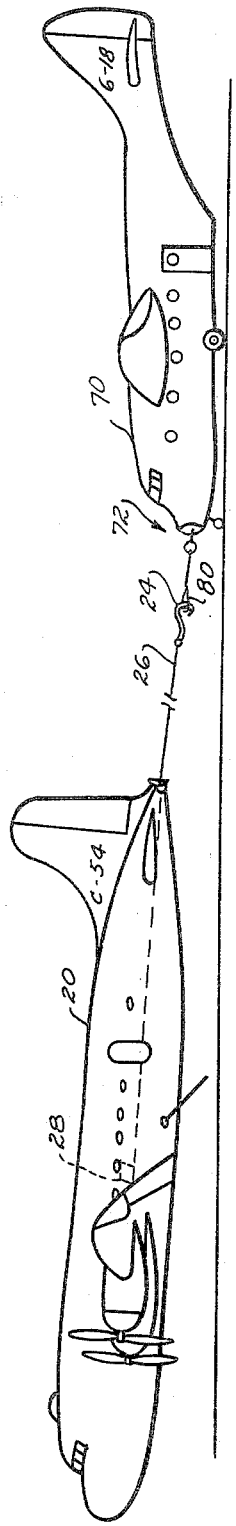
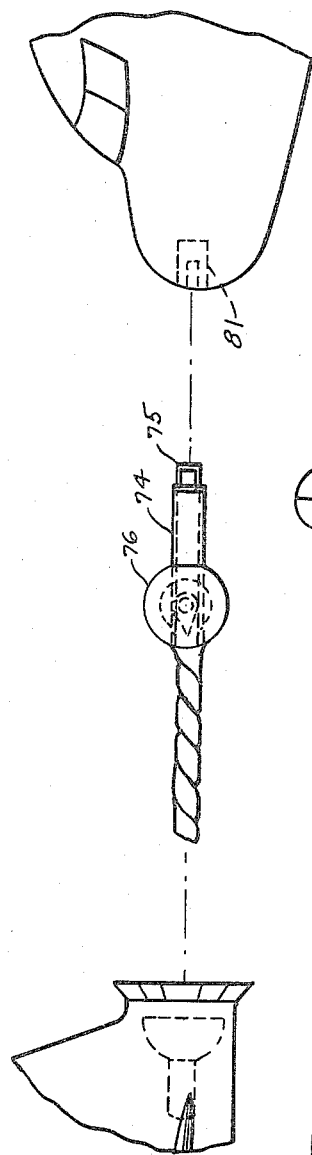
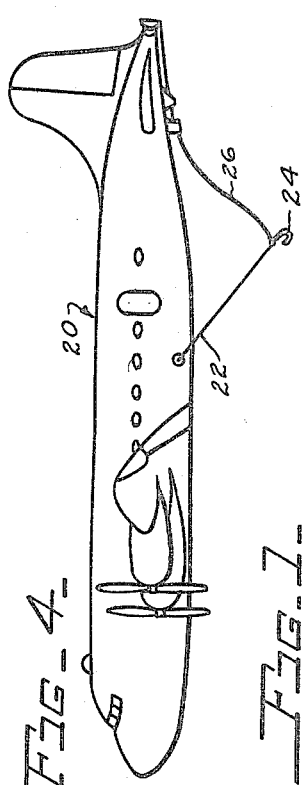
INVENTOR.
BERNHARD A. HOHMANN
BY
AGENT
AND
ATTORNEY

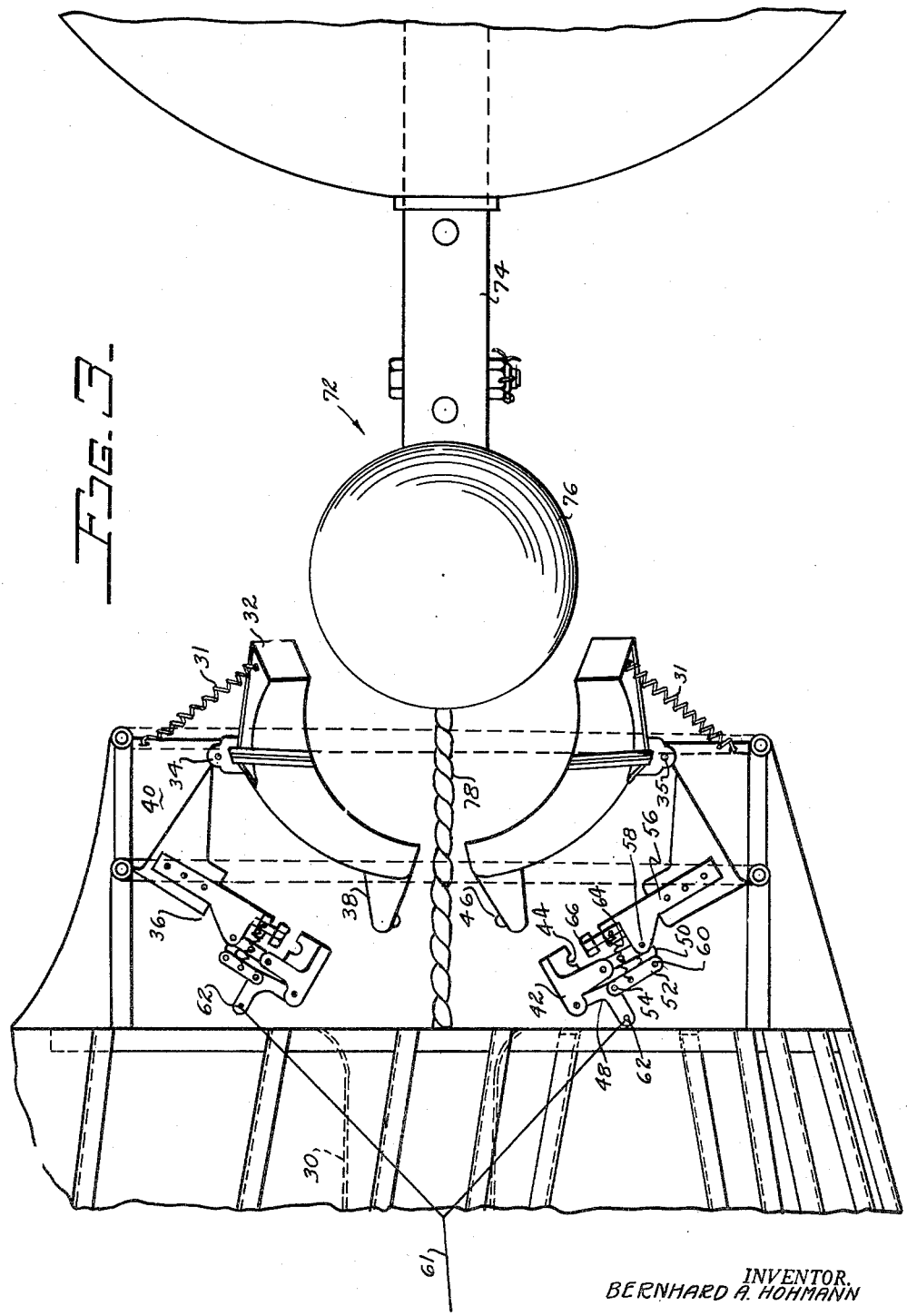

Nov. 15, 1955 B. A. HOHMANN 2,723,812
GLIDER PICK-UP
Filed Jan. 8, 1952 3 Sheets-Sheet 3
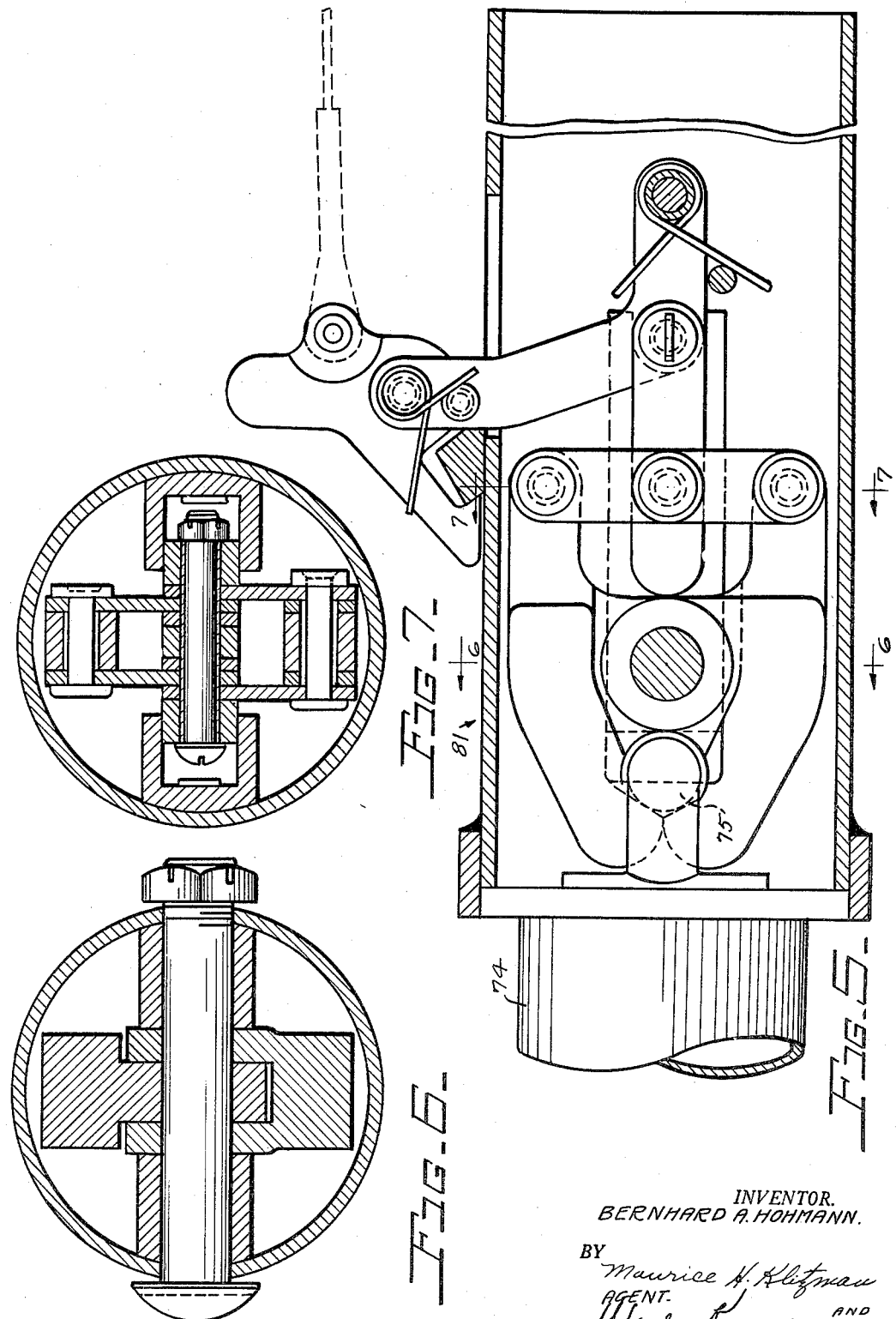
INVENTOR.
BERNHARD A. HOHMANN.
BY
Maurice H. Klitzman
AGENT.
Wade Koontz AND
ATTORNEY.

United States Patent Office 2,723,812
Patented Nov. 15, 1955

2,723,812
GLIDER PICK-UP

Bernhard A. Hohmann, Fairborn, Ohio

Application January 8, 1952, Serial No. 265,518

7 Claims. (Cl. 244—3)

(Granted under Title 35, U. S. Code (1952), sec. 266)

The invention described herein may be manufactured and used by or for the Government for governmental purposes, without the payment to me of any royalty thereon.

This invention relates to a combination glider pick-up system and rigid glider-tow system.

Past experiences have shown the necessity for a foolproof rescue operational system during bad flying weather or instrument flying conditions. Under the present glider pick-up systems it is impossible for the glider to be flown in instrument flying conditions after it has been picked up since the pick-up airplane must be kept in sight at all times, and during blind flying conditions the pick-up airplane cannot be seen. This is because a 600 to 800 foot cable must be used to pick up the glider which distance is too great under instrument flying conditions to keep the airplane in sight. The only other method known of flying the glider under bad weather conditions is by making a rigid short coupled tow bar connection between the glider and the airplane and taking off so that the glider may be kept close to the airplane and be seen more readily. This rigid connection method can be used only when the airplane can land and be fastened to the glider and not for picking up the glider while in flight. An objection to this rigid connection method is that when taking off and landing the tail of the airplane and nose of the glider will not be in sufficient alignment, nor will the aircraft be airborne at the same time for safe flying. The present invention combines the pick-up method with the rigid-tow flying method by picking up the glider with a flexible cable having a hook attached on one end thereof, and mounted on the airplane, said hook engaging a loop in a cable attached to said glider, and from the airplane winding in the cable and glider so that a rigid-tow on the glider becomes releasably locked to the airplane.

It is therefore an object of this invention to provide a method of glider pick-up during bad flying weather conditions.

It is a further object to combine the rigid glider-tow bar method of flying with the present-day method of glider pick-up system.

It is a still further object of this invention to provide a simple mechanical means for picking up a glider and bringing it into instrument flight position (this is the position when the glider is coupled closely or short to the airplane) with the pick-up airplane.

During certain emergencies it is desirable to release a glider over the rescue area for use by the parties to be rescued. Therefore, it is a still further object of this invention to provide a means for releasing a glider over the emergency area.

These and other objects will become apparent when read in the light of the accompanying drawings and specification wherein similar parts have like numbers.

Fig. 1 shows an airplane provided with pick-up mechanism adapted for use in this invention.

Fig. 2 shows the airplane in the process of picking up the glider.

Fig. 3 shows the glider being brought into instrument flight position.

Figs. 4–7 show a standard tow bar release device for a glider.

Referring to Figs. 1–7 airplane 20 has a pick-up boom 22 having a hook 24 removably mounted thereon. Said hook is connected to one end of a cable 26. The other end of the cable 26 is attached to a winch 28 or the like rotatably mounted in the airplane 20. The aft end of the airplane 20 is provided with a guide tube 30 for the cable 26; a sectional coupling housing 32 each section being pivotally mounted at points 34 and 35; and a stationary lock mechanism at 36. Mounted on the sectional housing 32 are arms 38 for engagement with the lock mechanism 36. Said lock mechanism 36 is mounted on a bracket 40 fixed to said airplane. The lock mechanism has a locking member 42 with a transverse groove 44 adapted to engage a transverse ridge 46 on the arm 38. The lock member 42 is pivotally mounted on bell cranks 48 and 50. Bell crank 48 is in turn pivoted to a link 52 at 54, and the bell crank 50 is pivoted to stationary member 56 at 58 and to the link 52 at 60. Said bell crank 48 has a cable release 61 attached at 62. A spring 64 is connected between the link 52 and bell crank 50 and also between bell crank 50 and stationary member 56. An adjustable bolt member 66 is mounted on the stationary member 56. The glider 70 has a rigid-tow bar generally designated as 72 releasably connected to the tow bar release in the nose of the glider. The rigid-tow 72 comprises a tubular member 74 having a ball 76 integrally mounted thereon and a D-ring welded thereto. At the other end of the rigid-tow bar 72 is attached a flexible cable 78 with a loop 80 therein. In the nose of the glider 70 is fixedly mounted a standard air force tow bar release mechanism 81, Patent Number 2,350,999, to releasably engage the other end of the D-ring 75.

In operation when picking up glider 70 the hook 24 mounted on boom 22 will engage the loop 80 attached to rigid-tow bar 72 thereby pulling the glider 70 and carrying it into the air. The winch 28 is then wound to bring the glider into rigid tow position. As the cable 26 is wound into the airplane, the hook 24 being smaller than the housing opening will pass through the sectional housing socket, and the ball 76 will engage the sectional housing socket 32, whereby the sectional housing 32 will pivot about points 34 moving the arms 38 into engagement with the locking member 42 so that said locking member 42 will be held in locking position in view of the force exerted by the springs 64, thereby providing a rigid single joint attachment coupling between the airplane 20 and glider 70. In this manner a rigid connection between the airplane and glider is provided so that a fixed predetermined short distance may be maintained and the glider pilot is sufficiently close enough so that he can see the airplane 20 and thereby guide the glider accordingly.

This system provides a simple and efficient way of rescuing during an emergency even though bad flying conditions make it impossible to utilize the present-day pick-up system.

Situations occur where it is unsafe for an airplane to land in view of bad flying or landing conditions but where a glider may be able to land. In this event a glider may be flown over the emergency area and released. The glider may be separated from the airplane by releasing the D-ring 75 from the tow bar release 81. The glider may then be flown to a landing place for picking up the parties to be rescued whereupon the airplane may then pick up the glider as hereinbefore described. Another glider cable embodying the subject invention and pick up mast may be carried in the glider as standard equipment. After the tow bar release 81 has separated the glider from the airplane, the cable 78 may be disposed of to ready the airplane for picking up the glider by separating the hook 24 from the loop 80 and pulling cable release 61 to open the lock mechanism 42, whereby the segmental housing socket 32 will open and allow the ball 76 to leave the socket and pull the cable 78 with it. The glider can pick up the cable 78 or use the other glider cable carried in the glider.

The subject invention may also be suitably adapted to picking up and towing assault aircraft whose flying range and take-off performances are limited.

It is apparent the specific embodiment shown above has been given by way of illustration and not by way of limitation and that the structure above described is subject to wide variation and modification without departing from the scope for intent of the invention all of which variations and modifications are to be considered as equivalents and be included within the scope of the present invention.

What is claimed is:

1. The combination of a glider tow pick-up system comprising a rigid-tow bar having a ball integral therewith, releasably and rigidly attached to the nose of a glider, a flexible glider tow cable having a loop therein connected to the ball of said rigid-tow bar; a pick-up airplane having a flexible glider pick-up cable attached to a winch in the airplane, a hook connected to the end of said flexible tow glider pick-up cable adapted to engage the loop in said glider tow cable, a normally open segmental ball receiving housing socket in the tail end of said airplane adapted to receive and engage with said ball, and a lock mechanism mounted in the tail end of said airplane adapted to lock said housing in ball engaging position to retain said ball in said housing, and a tow bar release in said glider for releasing said rigid-tow bar from said glider.

2. In an aerial pick-up and towing system comprising in combination, a glider, a tow airplane having a centrally apertured female coupling device mounted thereon, a flexible towing cable adapted to pass through the aperture of said connecting device, a winch for paying out and for reeling in said cable, a pick-up hook on the end of said towing cable, means for supporting the cable and hook for pick-up engagement with the glider, a rigid-tow bar releasably mounted on the nose of the said glider and having a male coupling element mounted thereon adapted to be received in towing engagement with said female coupling element but permitting a limited universal angular movement of the tow bar, and a pick-up cable loop secured to said tow bar forward of the male coupling element thereon whereby when said pick-up hook engages the pick-up loop on the glider the glider will be towed aloft from the ground and reeling in of the towing cable and hook on the airplane will cause ultimate coupling engagement between said male and female coupling elements to thereby establish a rigid connection between the airplane and the glider.

3. A pick-up cable mounted in an airplane for extension and retraction rearwardly thereof, said cable having a glider pick-up hook thereon, a rigid tow bar releasably mounted in the nose of a glider having a hook pick-up looped cable portion thereon adapted to receive said glider pick-up hook, and ball and socket between the airplane and tow bar coupling means with said ball being mounted on said rigid tow bar and said socket being mounted on said airplane respectively, thereby forming a single joint swivel connection between the airplane and the tow bar for permitting relative movement between said glider and airplane; whereby the glider may be picked up on the pick-up cable by the airplane, and the pick-up cable retracted so as to permit engagement of the ball and socket coupling, thereby making a short swiveled connection between the airplane and glider but allowing relative movement about the single ball and socket coupling joint therebetween.

4. An airplane having an extensible and retractable glider pick-up cable extending rearwardly carrying a glider pick-up hook at one end, a glider having a rigid tow bar releasably mounted in the nose thereof projecting forwardly said rigid tow bar having a cable extension formed with a hook pick-up loop attached thereto adapted to receive said glider pick-up hook to enable the airplane to pick up said glider, said glider pick-up cable being retractable into the airplane to bring said glider in position to couple said rigid tow bar to said airplane, a rigid coupling means between the outer end of the tow bar and the airplane for positive coupling between said tow bar permitting relative swivel movement therebetween when said glider is brought into coupling position and coupled to said airplane.

5. In a glider adapted to be picked up by an airplane, a rigid tow bar having a ball mounted on one end thereof and releasably connected to the nose of a glider at the other end, a flexible glider tow cable having a pick-up loop portion at its outer end and attached to said ball at its opposite end, loop pick-up means on said airplane adapted to engage said loop and pick up said glider at a distance rearwardly of the airplane and bring the glider toward the airplane into instrument flight position immediately behind the airplane, said ball being releasably lockingly received by a receiving socket arrangement in said airplane for swivelly connecting the glider through said tow bar to the airplane.

6. A glider tow pick-up combination comprising, an airplane provided with an opening having a segmental socket housing in the aft end thereof, a winch in said airplane, a pick-up cable connected to said winch at one end and having a hook attached at the other end, said cable extending through said opening and segmental socket housing, said segmental socket housing being pivotally mounted in the aft end of the airplane, spring means connected between said segmental socket housing and aft end adapted to keep the segmental socket housing in normal open position, locking means adapted to lock the segmental socket housing in closed position, and means for releasing said locking means to permit said spring means to open said segmental socket housing, a glider carrying a short towing connection comprising a rigid tubular section provided with a D-ring welded to one end and a ball secured to the other end, and a glider cable fixed to the ball and having a loop therein adapted to receive said hook, said D-ring being releasably mounted in the nose of said glider, said ball being adapted to lockingly engage with said segmental socket housing whereby said glider short towing connection loop may be picked up by the airplane pick-up cable hook and brought into engagement with the airplane by the cable being wound up until the ball becomes locked in the segmental socket housing thereby making a rigid swiveled towing connection between the airplane and glider.

7. A glider spaced from but rigidly connected to an airplane, said connection comprising a flexible glider pick-up cable retractably connected to said airplane, means in said airplane for retracting said cable into the airplane, a rigid tow bar releasably mounted on the front end of said glider having a forwardly extended loop portion connected to said flexible cable, a ball mounted on said rigid tow bar rearwardly of said forwardly extended loop portion, female coupling means on said airplane for receiving and releasably locking said ball therein so that the ball may be brought into position in the female coupling means by retracting the cable and the glider short coupled to the airplane by said rigid tow bar through said ball and female coupling means.

References Cited in the file of this patent

UNITED STATES PATENTS

| | | |
|---|---|---|
| 1,926,968 | Causan | Sept. 12, 1933 |
| 2,166,575 | Atcherley | July 18, 1939 |
| 2,350,999 | Beirise | June 13, 1944 |
| 2,385,392 | Van Dusen | Sept. 25, 1945 |
| 2,433,473 | Mitchell | Dec. 30, 1947 |
| 2,443,114 | Notestein et al. | June 8, 1948 |
| 2,443,276 | Seevers | June 15, 1948 |
| 2,547,772 | Peters | Apr. 3, 1951 |

FOREIGN PATENTS

| | | |
|---|---|---|
| 29,250 | Great Britain | Dec. 22, 1906 |